US009972356B2

(12) United States Patent
Shynar et al.

(10) Patent No.: US 9,972,356 B2
(45) Date of Patent: *May 15, 2018

(54) MEDIA SUMMARIZATION

(71) Applicant: Google Inc., Mountain View, CA (US)

(72) Inventors: Michael Shynar, Kiryat Ono (IL); Asaf Zomet, Jerusalem (IL); Gal Chechik, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/393,359

(22) Filed: Dec. 29, 2016

(65) Prior Publication Data

US 2017/0110153 A1 Apr. 20, 2017

Related U.S. Application Data

(63) Continuation of application No. 13/608,761, filed on Sep. 10, 2012, now Pat. No. 9,560,332.

(51) Int. Cl.
*G11B 27/031* (2006.01)
*H04N 9/87* (2006.01)
(Continued)

(52) U.S. Cl.
CPC ........... *G11B 27/031* (2013.01); *H04N 5/765* (2013.01); *H04N 9/8205* (2013.01); *H04N 9/87* (2013.01);
(Continued)

(58) Field of Classification Search
CPC .... H04N 9/87; H04N 21/252; H04N 21/8549; H04N 5/76; H04N 9/8205; H04N 5/765; G11B 27/031
(Continued)

(56) References Cited

U.S. PATENT DOCUMENTS 6,557,042 B1    4/2003  He et al.
8,131,786 B1    3/2012  Bengio
(Continued)

OTHER PUBLICATIONS

European Search Report for European Patent Application No. 13835450.1, dated Mar. 4, 2016, 9 pages.
(Continued)

*Primary Examiner* — Thai Tran
*Assistant Examiner* — Nien-Ru Yang
(74) *Attorney, Agent, or Firm* — Lowenstein Sandler LLP

(57) ABSTRACT

Techniques for summarizing media are described. A viewer-interaction analyzer receives a media file containing media, the media file including a plurality of segments. A segment of the media file is scored based on interactions of a set of raters. Viewer metrics on the segment of the media file are measured based on interactions with the segment of the media file by a set of viewers. A set of feature vectors are formed based on the measured viewer interactions, where feature vectors in the set of feature vectors are based on interactions of the set of viewers. A model is trained based on the set of feature vectors and the score assigned to the segment of the media file. The model is applied to segments of the media file to generate an interest rating for segments of the media file. An edited media file is generated based on segments of the media file having interest ratings that meet a criterion. The Abstract is submitted with the understanding that it will not be used to interpret or limit the scope or meaning of the claims.

20 Claims, 6 Drawing Sheets

(51) Int. Cl.
*H04N 5/765* (2006.01)
*H04N 21/8549* (2011.01)
*H04N 9/82* (2006.01)
*H04N 21/25* (2011.01)

(52) U.S. Cl.
CPC ....... *H04N 21/252* (2013.01); *H04N 21/8549* (2013.01)

(58) Field of Classification Search
USPC ........................................................ 386/241
See application file for complete search history.

(56) References Cited

U.S. PATENT DOCUMENTS

| | | |
|---|---|---|
| 8,132,200 B1 | 3/2012 | Karam |
| 2007/0074115 A1 | 3/2007 | Patten |
| 2009/0148133 A1* | 6/2009 | Nomura ............... G11B 27/105 386/248 |
| 2009/0164904 A1* | 6/2009 | Horowitz .......... G06F 17/30817 715/723 |
| 2010/0162286 A1 | 6/2010 | Berry |
| 2011/0029666 A1 | 2/2011 | Lopatecki et al. |
| 2013/0031034 A1* | 1/2013 | Gubin ............. G06Q 10/06393 706/12 |

OTHER PUBLICATIONS

International Search Report for International (PCT) Patent Application No. PCT/US2013/059091, dated Dec. 12, 2013 4 pages.
Written Opinion for International (PCT) Patent Application No. PCT/US2013/059091, dated Dec. 12, 2013, 5 pages.

\* cited by examiner

101

| O Video Sharing | _ ◲ ⊠ |

File  Edit  View  History  Bookmarks  Tools  Help

⇦ ⇨ ⌂ ⊗ 🏠 http://www.videosharing.com

Video — Sign Up | My Account | History | Help | Log in | Site
Share Yourself   Videos | Categories | Channels | Community   @ Upload ducati    [Search]    [Search]

Search results for "ducati"    ~103    1-20 of about 6,000

Sort by: Relevance | Date Added | View Count | Rating   Display:

La storia della Ducati Superbike
From early Pantah F1 to 1068, 25
years of Ducati superbike. Forza
~105  Daemo, Forza Ducati...Ducati
Superbike 999 888 915 748 995 998
F1 Desmoquatiro
Tags: Ducati Superbike 999 888 915
748 995 998 F1 Desmoquatiro Deemo
Time: 02:38

★★★★★
From: ElGladiatour
Views: 81,263
Added: 11 Months ago
More: Autos & Vehicle Lamborghini Gallardo vs. Ducati 999

Fith Geer clip featuring Lamborghini
~107  Gallardo vs. Ducati 999 .. Racing
supercar superbike Fifth Gear
Tags: racing supercar superbike fifth
gear
Time: 03:03

★★★☆☆
From: Jay302
Views: 285,614
Added: 1 year ago
More: Howto & Style

Mazda RX7 Tuned Vs Ducati 748
MAZDA ITS GANSTA .... Mazda RX7
Tags: Mazda Rx7
Time: 03:33

★★★★★
From: MRGEYEZ
Views: 215,493
Added: 1 year ago
More: Sports

Ducati 848 Elcma 2007
Ducati 848 Elerra 2007 by Motoblogit..

★★★☆☆
From: blogvideo

Done

Fig. 1

MEDIA SUMMARIZATION

RELATED APPLICATIONS

This application is a continuation of U.S. Nonprovisional patent application Ser. No. 13/608,761, filed on Sep. 10, 2012, entitled "Media Summarization," which is hereby incorporated by reference herein.

BACKGROUND

Video hosting refers to services, software, and/or hardware where viewers distribute video clips. Video-hosting websites allow viewers to discover videos available over the Internet. Typically, a viewer discovers videos of interest by submitting a search query to a video-hosting website or browsing in different categories or channels of the video-hosting website. Using either approach, the video host presents the viewer with a list of videos from which he or she can choose.

Once a viewer finds a video of interest and selects a link to the video, a client associated with the viewer loads a webpage associated with the video, and the viewer views the video and/or details of the video. The video-hosting website allows a viewer to search and view videos contained within the video-hosting website, or videos located on or sourced from other websites.

SUMMARY

Described herein are techniques for summarizing media, such as for example videos. A viewer-interaction analyzer receives a media file containing media. A segment of the media file is scored based on interactions of a set of raters. Viewer metrics on the segment of the media file are measured based on interactions with the segment of the media file by a set of viewers. A set of feature vectors are formed based on the measured viewer interactions, where feature vectors in the set of feature vectors are based on interactions of the set of viewers. A model is trained based on the set of feature vectors and the score assigned to the segment of the media file. The model is applied to segments of the media file to generate an interest rating for segments of the media file. An edited media file is generated based on segments of the media file having interest ratings that meet a criterion. The edited media file is stored as a summarized version of the media file.

This Summary introduces concepts in a simplified form that are further described below in the Detailed Description. This Summary is not intended to identify key features or essential features of the claimed subject matter, nor is this Summary intended to be used as an aid in determining the scope of the claimed subject matter. The term 'techniques', for instance, refers to device(s), system(s), method(s) and/or computer-readable instructions as permitted by the context above and throughout the document.

BRIEF DESCRIPTION OF THE FIGURES

The detailed description refers to the following accompanying drawings:

FIG. 1 displays a screen shot illustrating an example of a viewer interface displaying videos associated with a user search query in accordance with aspects of this disclosure.

DETAILED DESCRIPTION

Overview

Figure 2:
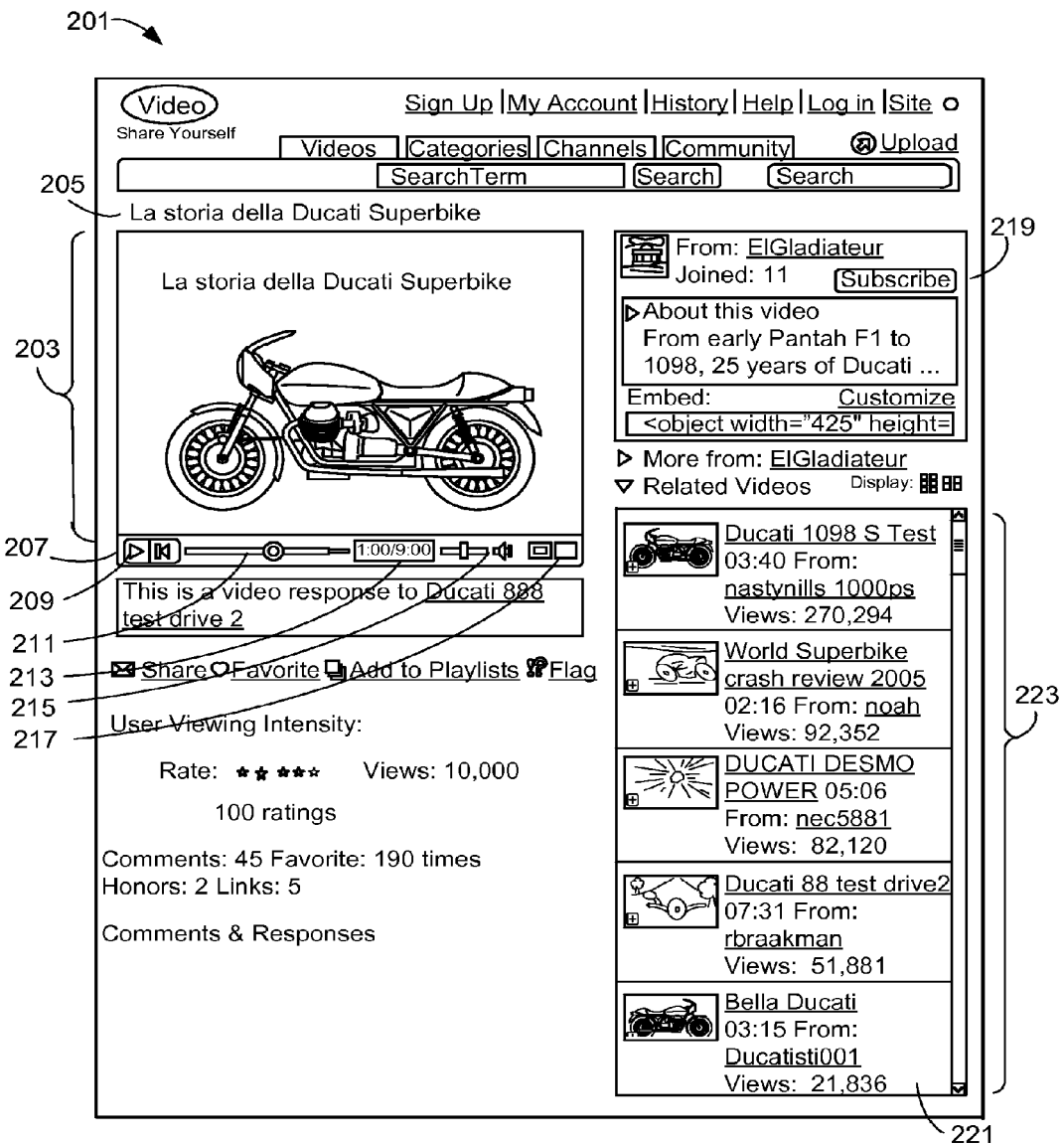
FIG. 2 displays a screen shot illustrating an example of a user interface displaying the video in accordance with aspects of this disclosure.

Content delivery systems provide viewers access to an enormous selection of media content, such as video. Today, a wide variety of individuals, professionals and non-professional alike, produce online video content. Some videos available online contain segments that may be considered less interesting or too long. Accordingly, sometimes when a viewer selects a video, that video contains segments of material in which the viewer is not interested. The viewer puts forth effort to view the content of the individual videos to determine if the video contains relevant material. Valuable time can be spent viewing videos without relevant or interesting content instead of videos with material that is truly relevant or interesting to the viewer.

In addition, many videos that people watch online, even when professionally produced, are quite long, for example an hour or longer. Sometimes there are parts that are less interesting that viewers choose to skip over. Other times there are parts that are particularly interesting and that viewers watch repeatedly. For example, football (i.e., soccer) matches are often recorded live, then replayed in their entirety. Soccer matches consist of two 45 minute periods. Often during the match, the teams are controlling the ball and jockeying for advantages. These long stretches can be interrupted with exhilarating segments, such as when a goal is scored, a goalie makes a great save, a penalty kick is rewarded, or the like. A viewer may miss this interesting content if the viewer stops watching or skips to the wrong part of the video. A viewer also may spend time inefficiently skipping back and forth in the video seeking the exciting moments in the sports video.

When viewing such video, each viewer discovers the parts that are more or less interesting or chooses to abandon the video. For example, a music video might start slow and not have interesting content. Later, the music video may have a spectacular visual and song, but the viewer may miss this interesting content if the viewer stops watching or skips to the wrong part.

By way of further example, FIG. 1 displays an example user interface 101 illustrating a result page responsive to a viewer querying the keyword "Ducati" into a dialog box 103, for videos related to products sold by Ducati Motor Holding S.P.A., 3 Via Cavalieri Ducati, Bologna, Italy. Ducati is a registered trademark of Ducati Motor Holding S.P.A. For the keyword, the user interface 101 lists appropriate videos retrieved from a video data store, such as a video database or video repository. Examples of appropriate videos may include "La storia della Ducati Superbike" 105 and "Lamborghini Gallardo vs. Ducati 999" 107. Lamborghini is a registered trademark of Automobili Lamborghini Holding S.p.A., Via Modena, 12 Sant'Agata Bolognese Italy 40019. After reviewing the result page, the viewer selects a video from the result page to watch.

After selection of the video, a front-end interface transmits and presents the requested video and related-video links to the viewer. In addition, icon or thumbnail views of related videos accompany the links, along with associated metadata such as, for example, title, author, tags, and rating. For example, if a viewer provides the front-end interface with a request for a specific video with the title of "La storia della Ducati Superbike", the front-end interface presents the selected video to the viewer along with links to related videos.

FIG. 2 displays an example webpage 201 playing the video 203 with the title of "La storia della Ducati Superbike" 205. The webpage 201 contains controls 207 that allow a viewer to control how and when to play the video 203. Such controls 207 can include, for example, a play/pause button 209, a progress bar 211 that allows a viewer to skip ahead or repeat, a timer 213, a volume control 215, and a screen size adjustment 217. A video-information box 219 contains information about the video. A related-videos box 221 contains links to videos that a video-hosting service has determined to display as related to video 203. A video-serving module retrieves the related videos from a video data store for viewer presentation. If a viewer selects a link of a related video, the video-hosting service can present the related video.

Figure 3:
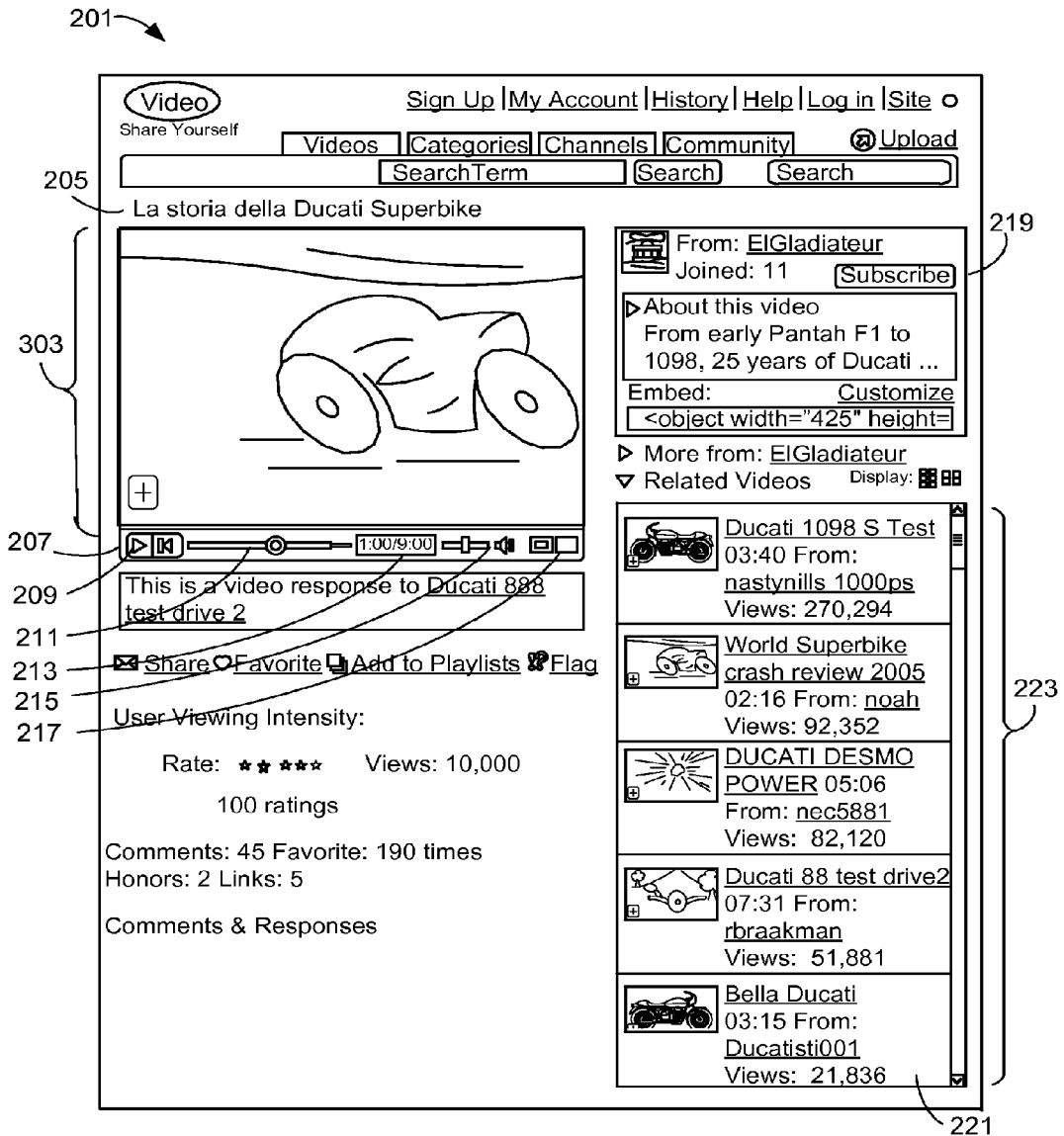
FIG. 3 displays another screen shot illustrating an example of a user interface displaying the video in accordance with aspects of this disclosure.

In FIG. 2, a segment of the video that is being displayed could be the beginning, where less interesting information may be displayed. For example, perhaps the beginning of a video has technical information such as engine displacement, top speed, 0-60 miles per hour time, and the like. FIG. 3 displays the same example webpage 201; however, in FIG. 3 a later segment of the "La storia della Ducati Superbike" video 303 is displayed. For example, this later segment might show interesting highlights from a motorcycle race.

Summarizing a video clip with its most interesting parts is one way of editing a long, less interesting video clip to be more interesting. Manual summation is time consuming and labor intensive. A problem in automatic video summarization, however, is selecting the most interesting parts of a video clip. In addition, manual summation involves subjective judgment of the editor, which can detract from the accuracy of the summation.

Described herein are techniques for summarizing media, such as videos. In one or more implementations, a data store stores the media file. A viewer-interaction analyzer is in communication with the data store. The viewer-interaction analyzer receives a file containing media. The media file is displayed to set of raters. A segment of the media file is scored based on interactions of the set of raters. Viewer metrics on the segment of the media file are measured based on interactions with the segment of the media file by a set of viewers. A set of feature vectors are formed based on the measured viewer interactions. The feature vectors in the set of feature vectors are based on interactions of the set of viewers.

A model is trained based on the set of feature vectors and the score assigned to the segment of the media file. The model is applied to segments of the media file to generate an interest rating for segments of the media file. An edited media file is generated based on segments of the media file having interest ratings that meet a criterion. The edited media file can be stored in the data store as a summarized version of the media file. In another embodiment, metadata having information with respect to segments of the media file can be stored for playing the edited video from the original media file.

This brief overview, as well as section titles and corresponding summaries, are provided for the reader's convenience and are not intended to limit the scope of the claims or the proceeding sections.

The Network

As mentioned previously, today video hosting is typically found on a computer network, such as the Internet. The Internet connects a global network of computers. Network servers support hypertext capabilities that permit the Internet to link together websites. Hypertext is text displayed on a computer or other electronic devices with references (for example, hyperlinks) to other text. Viewers navigate the Internet through graphical-user interfaces (GUI). Uniform-resource locators (URLs) identify specific websites and web pages. URLs also identify the address of the website to be retrieved from a network server. The transfer control protocol/internet protocol (TCP/IP) transfers information.

The Internet typically uses a hypertext language referred to as the hypertext mark-up language (HTML). HTML permits content providers to place hyperlinks within web pages. These hyperlinks connect related content or data, which may be found on multiple Internet-host computers. HTML document links retrieve remote data by use of hypertext transfer protocol (HTTP). When a viewer clicks on a link in a web document, the link icon in the document is associated with the URL that the client application employs to access the file located at the URL. HTTP is a protocol used to support the information transfer.

System Architecture

Figure 4:
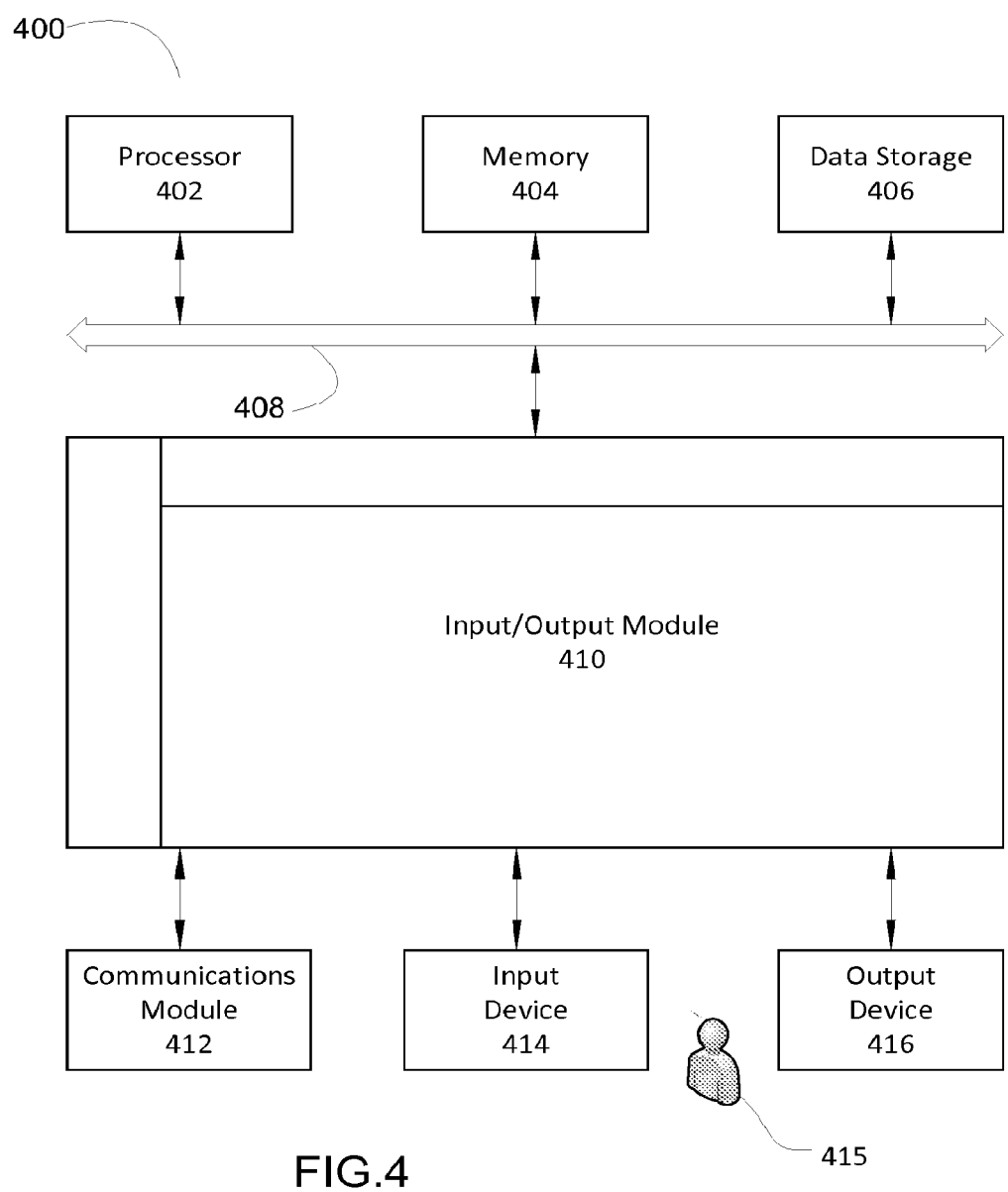
FIG. 4 displays a high-level block diagram of example computer architecture, in which techniques for summarizing media can be employed in accordance with aspects of this disclosure.

FIG. 4 displays a high-level block diagram of example computer architecture in which techniques for determining viewing behavior related to videos described herein can be employed. The computer system 400 can include, in addition to hardware, computer-executable instructions stored in memory 404. At least one bus 408 couples the memory 404 for storing information and instructions executable by processor 402. Special purpose logic circuitry can supplement or incorporate the processor 402 and the memory 404.

The instructions may be stored in the memory 404 and implemented in one or more computer program products. Computer program products can be one or more modules of computer program instructions encoded on a computer readable medium for execution by, or to control the operation of, the computer system 400. Memory 404 may store temporary variable or other intermediate information during execution of instructions executable by the processor 402.

The computer system 400 further includes a data store 406 coupled to bus 408. The data store 406 stores information and instructions. An input/output module 410 may couple computer system 400 to various devices. The input/output module 410 can be any input/output module. Examples of input/output modules 410 include data ports such as universal serial bus (USB) ports. The input/output module 410 connects to a communications module 412. Examples of communications modules 412 include networking interface cards, such as Ethernet cards and modems.

The input/output module 410 connects to a number of devices, such as an input device 414 and/or an output device 416. Examples of input devices 414 include a keyboard and a pointing device such as, for example, a mouse, by which a viewer 415 can provide input to the computer system 400. Examples of output devices 416 include display devices such as, for example, a liquid crystal display (LCD) monitor for displaying information to the viewer 415.

According to one aspect, the techniques described herein can be implemented using a computer system 400 in response to processor 402 executing one or more sequences of one or more instructions contained in memory 404. Another machine-readable medium, such as data storage device 406, may read such instructions into memory 404. Execution of the sequences of instructions contained in memory 404 causes processor 402 to perform the process steps described herein.

Computing system 400 can include or be a client and/or server. A client and server can be remote from each other and can interact through a communication network. The relationship of client and server arises by virtue of computer programs running on the respective computers and having a client-server relationship to each other.

Figure 5:
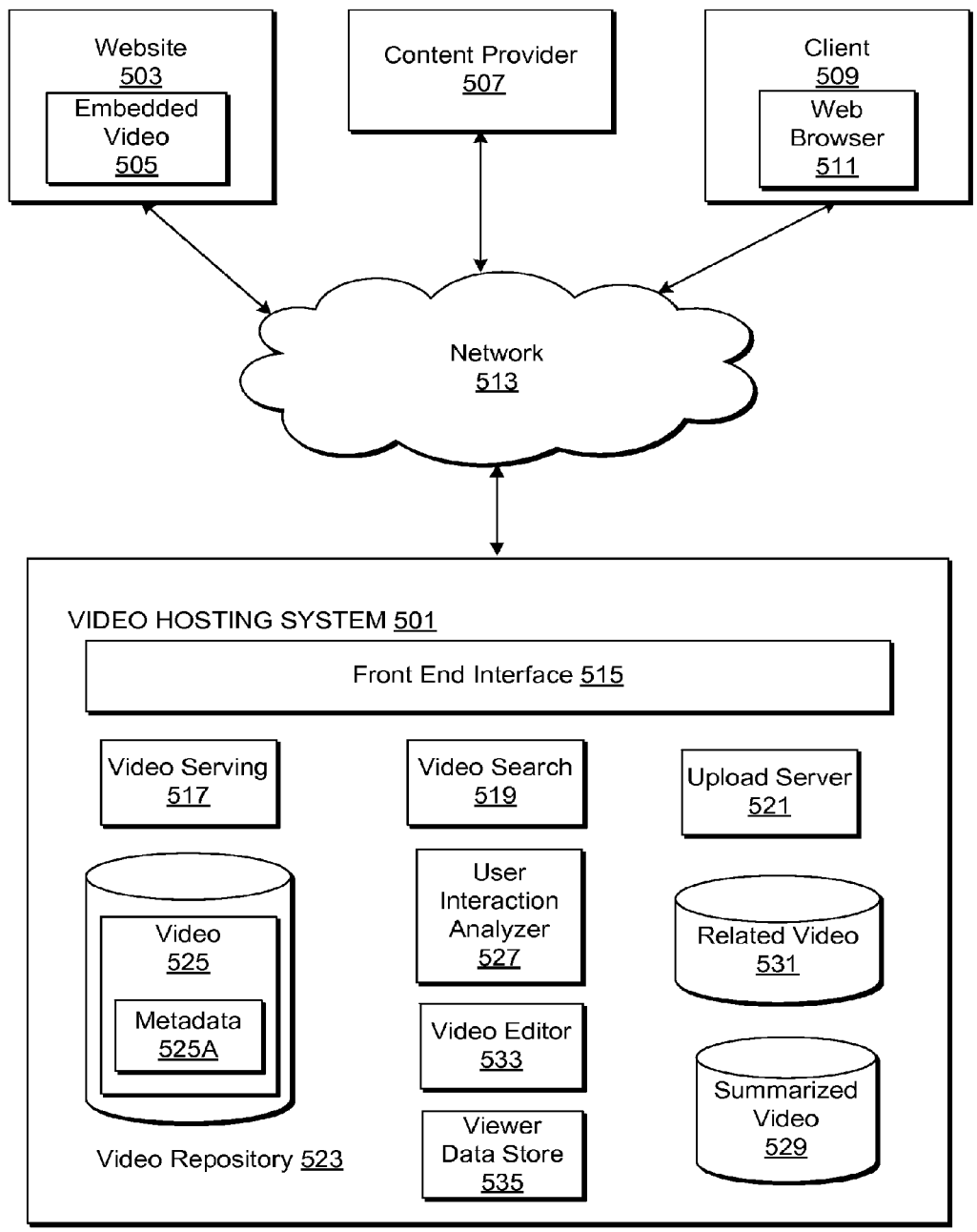
FIG. 5 displays a high-level block diagram of an example media-hosting service system architecture, in which techniques for summarizing media can be employed, in accordance with aspects of this disclosure.

FIG. 5 shows a high-level block diagram of an example media such as a video-hosting system 501 that identifies viewer behavior related to videos. Generally, the video-hosting system 501 represents any system that allows viewers to access video content via searching and/or browsing interfaces. In one implementation, the video-hosting system 501 makes available additional types of media. In addition to video, examples of media include audio media files such as music, podcasts, audio books, and the like; multimedia presentations; and so forth.

The video-hosting system 501 represents a system that stores and provides videos to viewers. The video-hosting system 501 communicates with a number of content providers 507 and clients 509 via a network 513. The configuration and management of large networks includes storage devices and computers that are communicatively coupled to dissimilar computers and storage devices. The network 513 is typically the Internet, but may be any network.

The client 509 is a computing device that executes client software such as, for example, a web browser 511 to load a website. The client 509 connects to the video-hosting system 501 via the network 513 to display videos. The client 509 can include a variety of different computing devices. Examples of computing devices include digital assistants, personal digital assistants, cellular phones, mobile phones, smart phones, laptop computers, tablet computers, and the like.

In some implementations, the client 509 includes an embedded-video player such as, for example, the FLASH® video player available from Adobe Systems Incorporated, 345 Park Avenue, San Jose, Calif. 95110. Of course, the client 509 can include other players adapted for the video file formats used in the video-hosting system 501, such as video players adapted for HTML5 video.

The viewer of the content provider 507 performs various content-provider functions. Examples of content-provider functions include uploading a video to the video-hosting system 501, editing a video stored by the video-hosting system 501, editing metadata information about a video, editing content-provider preferences associated with a video, and the like. For the sake of clarity, FIG. 5 depicts only one instance of website 503 and content provider 507, though there could be any number of each. In addition, while only one client 509 is shown, the video-hosting system 501 can support and communicate with very large numbers (such as millions) of clients at any time.

The video-hosting system 501 can include a front-end interface 515, a video-serving module 517, a video-search module 519, an upload server 521, a video data store 523, a viewer-interaction-analysis module 527, a summarized video data store 529, a related-videos data store 531, a video editor 533, and a viewer data store 535. Other conventional features such as, for example, firewalls, load balancers, authentication servers, application servers, failover servers, site-management tools, and so forth are not shown so as to illustrate more clearly certain features of the system.

The front-end interface 515 interfaces between the client 509 and the various components of the video-hosting system 501. The upload server 521 receives video content from a content provider 507. The video data store 523 contains a set of videos 525 submitted by content providers 507. The video data store 523 contains any number of videos 525 such as, for example, tens of thousands or hundreds of millions. The video data store 523 can be implemented using a data store or file system, with indexing system for indexing and retrieving videos. A unique video identifier distinguishes each video from other videos, such as a textual name (for example, the string "a91qrx8"), an integer or any other way of uniquely naming a video.

In addition to audiovisual content, the videos 525 include associated metadata 525A. Examples of metadata include textual metadata such as a title, description, and/or tags provided by a content provider 507 who uploaded the video or metadata obtained by an analysis of a video done by the video-hosting system 501.

Using the video-search module 519, clients 509 search for videos from the video-hosting system 501 using keywords, browse various categories or channels, review play lists from other viewers or the system administrator (such as collections of videos forming channels), view videos associated with particular viewer groups (such as communities), and the like. The video-search module 519 locates appropriate videos in the video data store 523 to return to the client 509. The video-serving module 517 provides video data from the video data store 523 to the client 509. The viewer interaction-analysis module 527 determines related videos for a given video. The summarized video data store 529 stores edited videos, as detailed below.

Video Summarization

As introduced above, techniques for summarizing media are described herein. Example implementations rate segments of media according to how interesting (or less interesting) the segments of media are to typical viewers.

In the techniques for summarizing media, the interactions of viewers as they watch and listen to the media are analyzed to identify what viewers consider the most interesting segments of the media. These interactions include a number of viewer engagements and interactions with the media, and are described below with respect to an implementation for video media. While the implementation of techniques for summarizing media is described herein with respect to video media, these techniques can be applied to audio media files such as music, podcasts, audio books, and the like; multimedia presentations; and so forth.

Viewership of a video clip usually declines as the video clip is watched. Only the most interesting of video clips maintain the same number of viewers at the end of the video clip as at the beginning. The way in which viewership declines takes place as a video clip is played is indicative, to some degree, of how interesting a video clip is.

The techniques for summarizing media in one implementation utilize three groups of viewers, although membership in such viewer groups may overlap. The first set—referred to herein as group A or raters—are viewers who score video segments in some interest scoring, either ordinal level or comparison. In the more common implementation, this would be a relatively small group, for example, hundreds of viewers.

The second set—referred to herein as group B or interacting viewers1—are all viewers that interact with the videos in a training set. In one implementation, this set can be relatively large, for example, billions of viewers.

The third set—referred to herein as group C or interacting viewers2—are all viewers that interact with a given "new" video. In one implementation, this group can be relatively larger than the raters group but relatively smaller than the interacting viewers1 group, for example, anywhere from hundreds of viewers to hundreds of millions of viewers.

From the ratings of the set of raters—group A—and the viewer interactions of the set of interacting viewers1—group B—a model is trained. Segments of a new video are scored given the model and viewer interactions of group C.

In one implementation, a video clip can be partitioned into segments (or shots), not necessarily of equal length. Segments of a video clip are scored based on the interest level displayed when viewing the segment. Interest level can be determined in various ways. For example, raters can directly enter their interest levels. The rater can provide an 'interest level' per segment, or provide comparative measures, as in 'segment 1 is more interesting than segment 2'. An example of how to train a model based on relative human judgment (as opposed to based on human ordinal scoring) is seen in Chechik, Sharma, Shalit, Bengio, "Large Scale Online Learning of Image Similarity Through Ranking", 11 Journal of Machine Learning Research 1109 (March 2010).

Interactions from the groups of interacting viewers1 and interacting viewers2 can be determined in various ways. For example, viewers repeating a segment, skipping a segment, pausing on a segment, increasing playback speed during a segment, decreasing playback speed during a segment, reducing audio volume during a segment, increasing audio volume during a segment, etc. can be utilized. Also, viewer comments on the video can be utilized, such as when a viewer comment mentions a specific moment in the video. Links into a specific point in the video can be utilized.

It is to be appreciated that in accordance with one or more implementations described in this disclosure, viewers can opt-out of providing information, such as personal information, demographic information, location information, proprietary information, sensitive information, or the like. Moreover, one or more implementations described herein can provide for anonymizing collected, received, or transmitted data.

For some implementations, scoring is binary, so that a segment is tagged as either less interesting or interesting. Some implementations score video segments at a higher level of granularity. For example, implementations may score a segment with a viewer interest integer n, where $0 \leq n \leq N$, and where N denotes the highest level of viewer interest.

At the beginning of a segment, viewership is normalized. For example, viewership may be normalized to one at the beginning of a segment. For some implementations, if the normalized viewership during playback of a segment falls below some threshold T, where $0<T<1$, then the segment may be tagged as less interesting.
Otherwise, the segment is tagged as interesting. When viewership falls below the threshold T, the segment length can be adjusted. The threshold can be calibrated post-calculation to retain a minimum length of viewership, for example to enforce a maximum length, or both.

Other implementations measure the time derivative of viewership as the segment is played. An increase in the magnitude of this time derivative is indicative of a rapid decline in viewership, signaling that the segment is considered less interesting. Implementations may tag the segment as less interesting if the time derivative of viewership at any point in time during playback is greater in magnitude than some specified threshold. A decrease in the magnitude of this time derivative is indicative of a rapid increase in viewership, signaling that the segment is considered more interesting Implementations may tag the segment as more interesting if the time derivative of viewership at any point in time during playback is less in magnitude than some specified threshold.

For some implementations where scoring levels are not binary, a set of thresholds $\{T_0\ T_1\ T\ \ldots\ T_N\}$ may be introduced, where $T_0 < T_1 < \ldots T_N$, and where a segment is scored with the viewer interest integer n if the maximum of the magnitude of the time derivative viewership during playback of the segment falls within the interval $[T_n\ T_{n+1})$, where $T_{N+1}$ may be taken as infinity for convenience.

For some video clips, interesting segments may follow a succession of less interesting segments. Viewership may decline precipitously after the first several less interesting segments, but there may be many more interesting segments later in the video clip. Measuring viewership rate at later times may not be statistically significant due to the large drop-off in viewership. Accordingly, the system can employ metrics that capture interesting segments in a video when viewership is relatively low, e.g., due to earlier less interesting segments, such as by normalizing to a lower viewership level or employing metrics that weigh depth of interaction more heavily than breadth of interaction.

For example, viewer interactions signaling deeper interactions with a video clip can be measured. Examples include whether a viewer takes action on a segment to share, post a comment, chat, make an annotation, transition from a seek action to a play action, go to full screen, increase volume, retract from full screen, or decrease volume. The latter examples may indicate a less interesting segment, whereas the former examples may indicate an interesting segment.

Regression analysis and other types of filtering (smoothing) operations may be performed on some of the measured quantities described above. Regression analysis refers to a statistical technique for estimating the relationships among variables. Various examples of regression analysis include the linear regression model, simple linear regression, logistic regression, nonlinear regression, nonparametric regression, robust regression, and stepwise regression.

For example, a time instance may be taken as one second, and the time derivative of viewership may be measured at each time instance. The result is a time series of viewership measurements (in this case where the measurement is the time derivative). Such a time series may be referred to as a viewer graph. Filtering may be applied to these raw measurements of time derivatives, resulting in a smoothed time series or viewer graph. The previously described metric where the time derivatives were compared to a threshold may now be applied to the smoothed time derivatives. Similar remarks apply to the other measured quantities.

The metrics described above may be grouped together to form a feature vector, so that associated with each segment is a feature vector whose components are the values of the metrics as measured. A feature vector is an n-dimensional vector of numerical features that represent some object. A regression filter or classifier may be trained on a large number of segments and viewers.

For example, a segment may be scored by one or more video viewers to determine the degree of viewer interest that should be associated with the segment, and an integer scoring of 0 to 10 may be determined for a segment. In addition to or alternatively, relative scoring (a is better than b) rather than ordinal scoring (a should get a score of 7) can be utilized. A large group of viewers may then view the segment, so that a set of measured feature vectors is obtained. Given the scoring that the viewers applied to the segment, any number of statistical techniques, such as regression analysis or classification, may be applied to the set of measured featured vectors so as to train a regression filter or classifier.

Regression filters or classifiers are examples of models. Generally, a model may be viewed as a mapping of independent variables (the measured viewership metrics) to the dependent variable (the interesting scoring of a segment). Models other than a regression filter or classifier may be chosen.

Once a regression filter or classifier is determined, the regression filter or classifier may be used on video clips as the video clips are received by a video hosting system, so that the video clips may be summarized (edited). For example, a summary where all segments with a scoring below 5 on a scoring scale of 0 to 10 may be edited out, so as to provide a shorter, more interesting video clip. The original video clip may be retained for archival purposes or made available for full viewing by viewers. More than one edited version may be produced, thereby giving viewers an option of what may be viewed.

Figure 6:
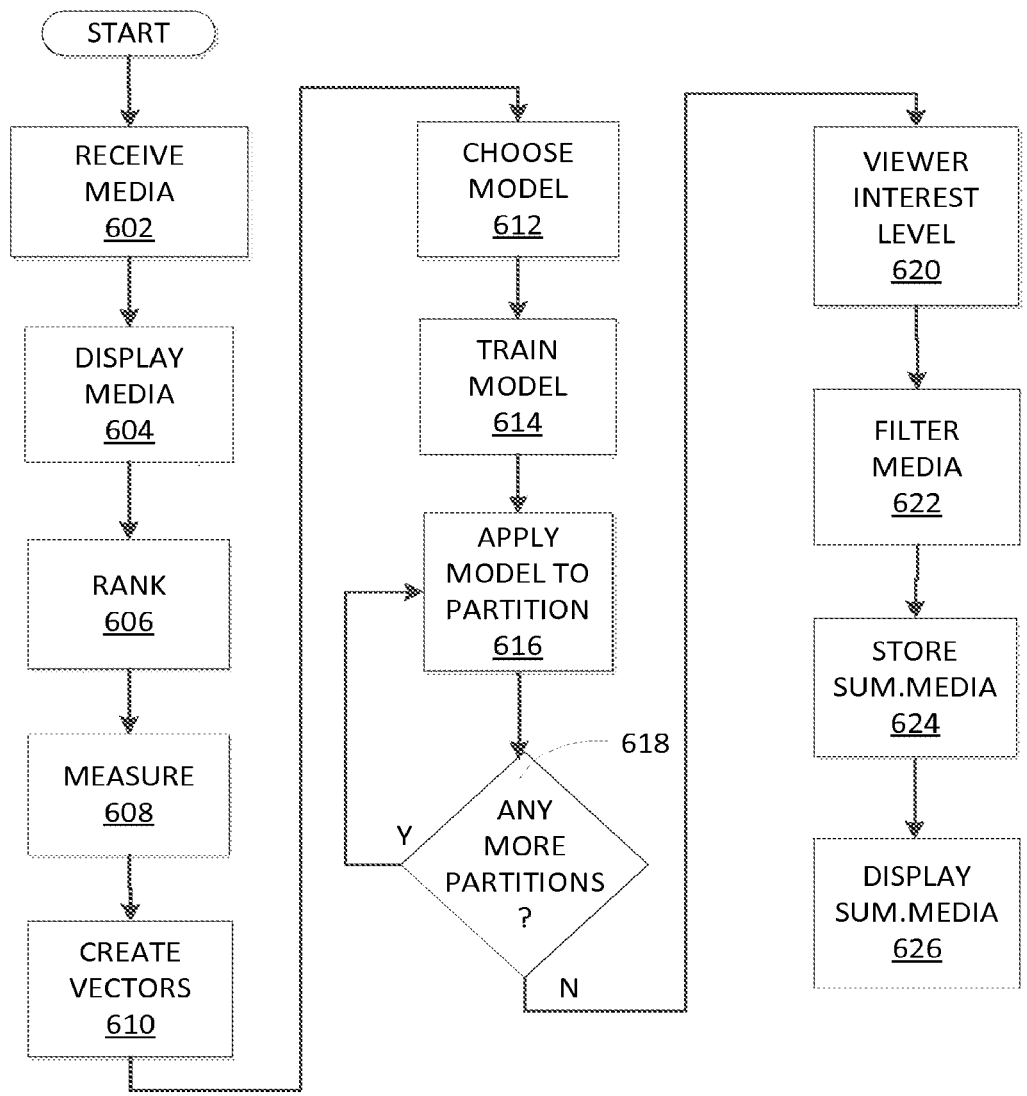
FIG. 6 displays a flow chart of an example process for summarizing media in accordance with aspects of this disclosure.

FIG. 6 is a flow chart illustrating operations of the media-hosting system 501 in summarizing media according to one implementation. Other implementations perform the steps of FIG. 6 in different orders. In addition, other implementations include different and/or additional steps than the steps described herein.

When a video is received (602), the video clip is displayed to rankers (604). The ranker can rank a segment according to how interesting the segment would be to a typical viewer (606). As viewers watch the segment, measurements of the viewer's interactions are taken (608), as described above. A set of feature vectors are created (610). A model, such as a regression filter or classifier, is chosen (612). The model is trained on the set of feature vectors using the ranking provided by the viewers (614). This process is repeated for other segments making up the video clip, and the model is updated accordingly. Training can be further partitioned based on different types of videos. For example, different models can be developed for sports verses music videos.

When training is completed, a model is available for editing a video clip. The model is applied to a segment (616). It is determined whether the model has been applied to each segment (618). If the model has been applied to each segment, a numerical value is yielded indicating viewer interest level (620). Uninteresting segments may then be filtered out (622), resulting in one or more edited (summarized) video clips stored in memory (624), such as the summarized video database 229 in Figure the edited video clips can be displayed on a display (626), such as on the displays depicted in FIGS. 2 and 3. In another embodiment, metadata having information with respect to segments of the media file can be stored for playing the edited video from the original media file.

Thus, by utilizing techniques described herein, media can be automatically summarized, and the summary can be made available for viewers to provide a more interesting and/or optimal viewing experience.

Concluding Notes

For the purposes of convenience, the uploaded media is described in a 'video' or 'videos' implementation; however, limitations on the types of uploaded media are not intended. Thus, the operations described for summarizing media can apply to any type of media, not only videos. Examples of media include audio files such as music, podcasts, audio books, and the like; photo galleries, e-books, electronic comic books, and the like; multimedia presentations; and so forth.

The implementation described herein is not inherently related to any particular hardware or other apparatus. The operations of the media summarizing system can be controlled through either hardware or through computer programs installed in computer storage and executed by the processors of servers. One or more processors in a multi-processing arrangement also may be employed to execute the sequences of instructions.

When embodied as hardware, the hardware may be specially constructed for the required purposes or the hardware may include a general-purpose computer selectively activated or reconfigured by a computer program stored on a computer-readable medium. In addition, the implementation described herein is not limited to any particular programming language.

The media summarizing system may be implemented using a single computer or a network of computers, including cloud-based computing. The computers can be server-class computers including one or more high-performance central processing units (CPUs), memory such as, for example, one gigabyte (1 GB) or more of main memory, as well as 500 GB to two terabyte (2 TB) of computer-readable persistent storage, network interface, peripheral interfaces, and other well-known components.

The computers can run an operating system. Examples of operating systems include the LINUX® computer-operating system or variants thereof and the like. LINUX® computer-operating system is an open-source operating system that is available under a general-public license administered by The Linux Foundation, 1796 18th Street, Suite C, San Francisco, Calif. 94107. Of course, other types of operating system and computers can be used, and it is expected that more powerful computers developed in the future can be configured in accordance with the teachings herein.

In addition to the Internet, the network may be any network. Examples of networks include local area networks (LAN), metropolitan area networks (MAN), campus area networks (CAN), wide area networks (WAN), mobile wired or wireless networks, private networks, virtual private networks, and the like. In addition, all or some of links can be encrypted using conventional encryption technologies. Examples of encryption technologies include the secure-sockets layer (SSL), secure http, virtual private networks (VPNS), and the like. Other implementations utilize custom and/or dedicated data communications technologies instead of, or in addition to, the communications technologies described above.

The terms client and content provider as used herein may refer to software providing client and content-providing functionality, to hardware devices on which the software executes or to the entities operating the software and/or hardware. The term 'website' represents any computer system adapted to serve content using any internetworking protocols, and is not limited to content uploaded or downloaded via the Internet or HTTP.

The term computer-readable media includes computer-storage media. Example include magnetic-storage devices such as hard disks, floppy disks, and magnetic tape; optical disks such as compact disks (CD) and digital-versatile disks (DVD); magnetic-storage devices such as digital tapes, floppy disks, and magneto-resistive-random-access memory (MRAM); non-volatile memory such as read-only memory (ROM), erasable-programmable-read-only memory (EPROMs), and electrically-erasable-programmable-read-only memory (EEPROMs); volatile memory such as random-access memory (RAM), dynamic random access memory (DRAM), ferroelectric-random-access memory (FeRAM), and static-random-access memory (SRAM); or any type of media suitable for storing electronic instructions.

Furthermore, at times arrangements of operations have been referred to as modules or by functional names, without loss of generality. The term 'module' refers to computational logic for providing the specified functionality. The division of functionality between components, the naming of modules, components, attributes, data structures or any other programming or structural aspect is merely exemplary, and not mandatory or significant. In addition, other implementations may lack modules and/or distribute the described functionality among modules in a different manner Functions performed by a component may instead be performed by multiple components, and functions performed by multiple components may instead performed by a single component. In general, functions described in one implementation as performing on the server side can be performed on the client side in other implementations and vice versa, if appropriate.

Although the subject matter has been described with a specific implementation, other alternatives, modifications, and variations will be apparent to those skilled in the art. Accordingly, the disclosure is intended to be illustrative, but not limiting, and all such alternatives, modifications, and variations are within the spirit and scope of the following claims.

What is claimed is:

1. At least one computing device comprising:
   a data store configured to store media;
   a processor communicatively coupled to the data store, the processor configured to:
      maintain a model indicating which media file segments are likely to be more interesting to media viewers, the model being trained based on user interactions with individual segments of a training set of media files and interest scores assigned by users to the individual segments of the training set of media files, wherein the user interactions comprise a change in viewership during a presentation of one of the individual segments;
      apply, by the computing device, the model to segments of a current media file to generate interest ratings for the segments, wherein an interest rating for a segment is based on a change in viewership during a presentation of the segment;
      generate, based on the interest ratings, an edited media file for the current media file, the edited media file including segments of the current media file having interest ratings that meet a threshold criterion; and
      add the edited media file to the data store as a summarized version of the current media file.

2. The at least one computing device of claim 1, wherein the user interactions comprise one or more of viewership repeating a segment, viewership skipping a segment, or viewership pausing on a segment.

3. The at least one computing device of claim 1, further comprising editing the media file by filtering from the media file those segments of the media file whose interest score falls below the threshold criterion.

4. The at least one computing device of claim 1, wherein the user interactions comprise one or more of viewership drop-off, viewership full-screen, viewership annotating, viewership sharing, viewership comment posting, viewership chatting, viewership transitioning from a seek action to a play action, or viewership transitioning between a full screen and a small screen.

5. The at least one computing device of claim 1, further comprising training the model based on a regression analysis.

6. The at least one computing device of claim 1, wherein the processor is further configured to monitor interactions of a set of viewers with the segments of the current media file, the monitored interactions to be mapped to the interest ratings for the segments of the current media file using the model, the interactions comprising at least one of repeating a segment, skipping a segment, or pausing on a segment.

7. The at least one computing device of claim 1, wherein the processor is further configured to train the model by:
   receiving interest scores assigned to the individual segments of the training set of media files;
   measuring viewer metrics for the individual segments of the training set of media files based on the user interactions with the individual segments of the training set of media files; and
   forming a set of feature vectors based on the viewer metrics.

8. The at least one computing device of claim 1, wherein the media file is a video clip.

9. A method implemented by one or more computing devices, the method comprising:
   maintaining a model indicating which media file segments are likely to be more interesting to media viewers, the model being trained based on user interactions with individual segments of a training set of media files and interest scores assigned by users to the individual segments of the training set of media files, wherein the user interactions comprise a change in viewership during a presentation of one of the individual segments;
   applying, by a processing device, the model to segments of a current media file to generate interest ratings for the segments, wherein an interest rating for a segment is based on a change in viewership during a presentation of the segment;
   generating, based on the interest ratings, an edited media file for the current media file, the edited media file including segments of the current media file having interest ratings that meet a threshold criterion; and
   storing the edited media file in a data store as a summarized version of the current media file.

10. The method of claim 9, wherein the user interactions comprise one or more of viewership repeating a segment, viewership skipping a segment, or viewership pausing on a segment.

11. The method of claim 9, further comprising editing the current media file by filtering from the current media file segments of the media file whose interest score falls below the threshold criterion.

12. The method of claim 9, further comprising training the model based on regression analysis.

13. The method of claim 9, wherein applying the model to segments of the current media file comprises monitoring interactions of a set of viewers with the segments of the current media file, the monitored interactions to be mapped to the interest ratings for the segments of the current media file using the model.

14. The method of claim 9, further comprising training the model by:
   receiving interest scores assigned to the individual segments of the training set of media files;
   measuring viewer metrics for the individual segments of the training set of media files based on the user interactions with the individual segments of the training set of media files; and
   forming a set of feature vectors based on the viewer metrics.

15. One or more non-transitory computer-readable media storing processor-executable instructions that, when executed, cause one or more processors to perform operations comprising:
   maintaining a model indicating which media file segments are likely to be more interesting to media viewers, the model being trained based on user interactions with individual segments of a training set of media files and interest scores assigned by users to the individual segments of the training set of media files, wherein the user interactions comprise a change in viewership during a presentation of one of the individual segments;
   applying, by the one or more processors, the model to segments of a current media file to generate interest ratings for the segments, wherein an interest rating for a segment is based on a change in viewership during a presentation of the segment;
   generating, based on the interest ratings, an edited media file for the current media file, the edited media file including segments of the current media file having interest ratings that meet a threshold criterion; and
   storing the edited media file in a data store as a summarized version of the current media file.

16. The one or more non-transitory computer-readable media storing processor-executable instructions of claim 15, wherein the user interactions comprise one or more of viewership repeating a segment, viewership skipping a segment, or viewership pausing on a segment.

17. The one or more non-transitory computer-readable media storing processor-executable instructions of claim 15, further comprising editing the current media file by filtering from the current media file segments of the media file whose interest score falls below a threshold.

18. The one or more non-transitory computer-readable media storing processor-executable instructions of claim 15, further comprising training the model.

19. The one or more non-transitory computer-readable media storing processor-executable instructions of claim 15, wherein applying the model to segments of the current media file comprises monitoring interactions of a set of viewers with the segments of the current media file, the monitored interactions to be mapped to the interest ratings for the segments of the current media file using the model.

20. The one or more non-transitory computer-readable media storing processor-executable instructions of claim 15, wherein training the model comprises:
   receiving interest scores assigned to the individual segments of the training set of media files;
   measuring viewer metrics for the individual segments of the training set of media files based on the user interactions with the individual segments of the training set of media files; and
   forming a set of feature vectors based on the viewer metrics.

* * * * *